US012610222B2

(12) United States Patent
Hosey et al.

(10) Patent No.: US 12,610,222 B2
(45) Date of Patent: Apr. 21, 2026

(54) INTELLIGENT MOBILE TELECOMMUNICATIONS CALL ROUTING ALTERNATIVE

(71) Applicant: GM GLOBAL TECHNOLOGY OPERATIONS LLC, Detroit, MI (US)

(72) Inventors: Eric T. Hosey, Royal Oak, MI (US); Matthew E. Gilbert-Eyres, Rochester Hills, MI (US); Russell A. Patenaude, Macomb Township, MI (US); Robert Myers, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 400 days.

(21) Appl. No.: 18/310,628

(22) Filed: May 2, 2023

(65) Prior Publication Data

US 2024/0373203 A1     Nov. 7, 2024

(51) Int. Cl.
*H04W 4/90*          (2018.01)
*H04M 1/72409*     (2021.01)
*H04W 4/02*          (2018.01)

(52) U.S. Cl.
CPC ....... *H04W 4/90* (2018.02); *H04M 1/724098* (2022.02); *H04W 4/02* (2013.01)

(58) Field of Classification Search
CPC ........... H04W 4/90; H04W 4/02; H04W 4/16; H04W 4/40; H04W 36/14; H04W 36/165; H04W 40/02; H04W 40/34; H04M 1/724098
See application file for complete search history.

(56) References Cited

U.S. PATENT DOCUMENTS

| | | | | |
|---|---|---|---|---|
| 9,116,786 B2 * | 8/2015 | Ricci | ................... | H04L 12/6418 |
| 2011/0225260 A1 * | 9/2011 | Kalhous | ............. | B60H 1/00807 |
| | | | | 709/217 |
| 2013/0143601 A1 * | 6/2013 | Ricci | ................ | H04N 21/41422 |
| | | | | 455/456.3 |
| 2016/0165548 A1 * | 6/2016 | Mohlmann | ........ | H04B 7/15535 |
| | | | | 455/522 |
| 2021/0014134 A1 * | 1/2021 | Dribinski | ............... | G07C 5/008 |
| 2023/0199612 A1 * | 6/2023 | Butler | ................... | H04W 4/029 |
| | | | | 455/418 |

FOREIGN PATENT DOCUMENTS

| | | | | |
|---|---|---|---|---|
| CN | 119299976 A | * | 1/2025 | .......... H04W 36/304 |

* cited by examiner

*Primary Examiner* — Farid Seyedvosoghi
(74) *Attorney, Agent, or Firm* — Quinn IP Law

(57)          ABSTRACT

A method for controlling a telecommunications system of a vehicle, the system including a mobile telecommunications module embedded in the vehicle, includes determining whether the embedded mobile telecommunications module is better able to communicate with a mobile telecommunications network than is a portable mobile telecommunications device located in the vehicle, using one or more criteria. If the embedded mobile telecommunications module is better able to communicate with a mobile telecommunications network than is the portable mobile telecommunications device based on the one or more criteria, a new call is placed with a mobile telecommunications network from the embedded mobile telecommunications module.

20 Claims, 4 Drawing Sheets

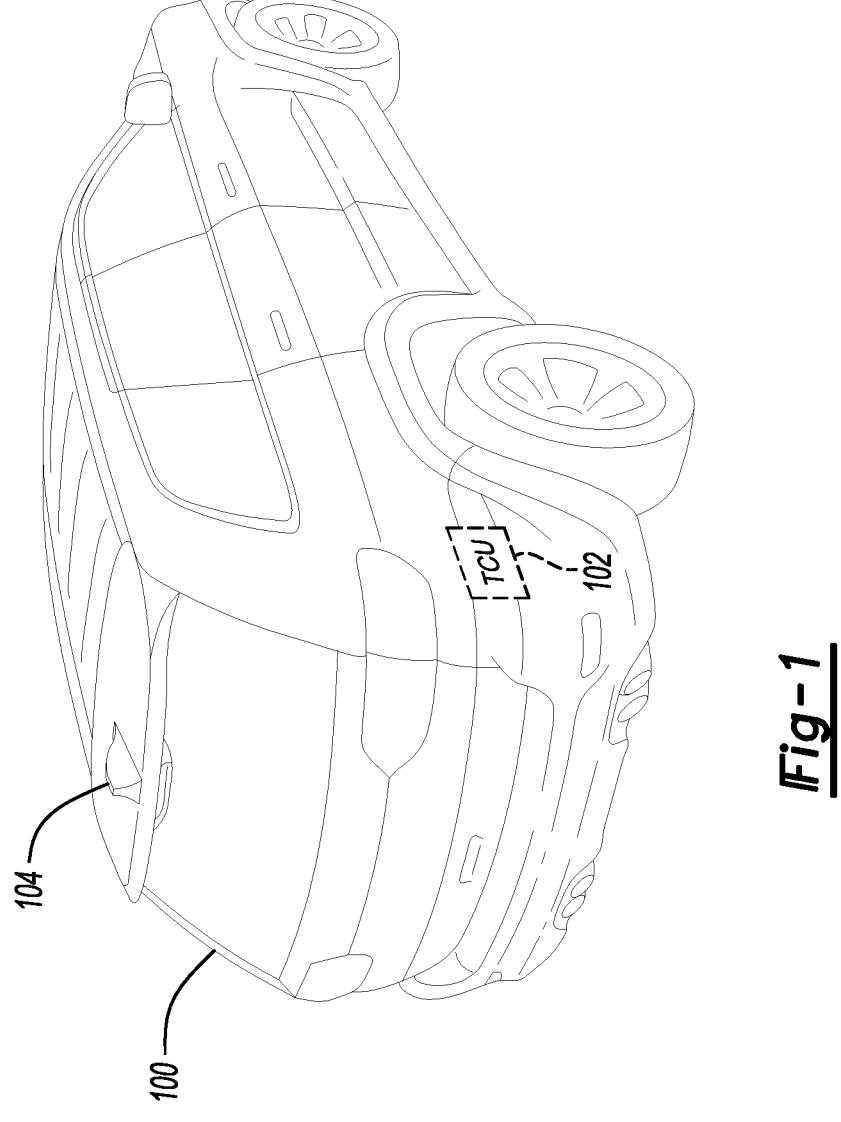
_Fig-1_

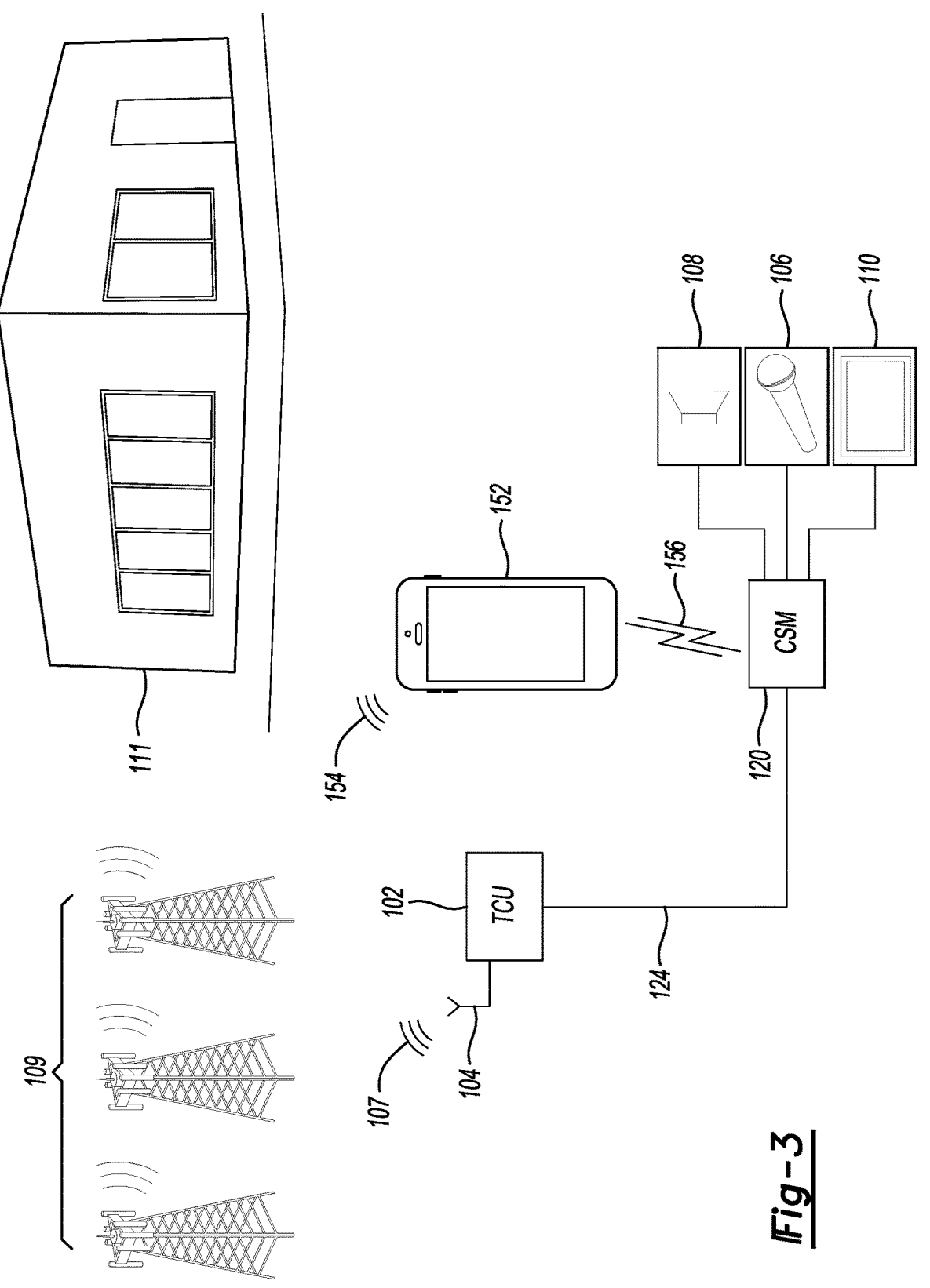
_Fig-3_

INTELLIGENT MOBILE TELECOMMUNICATIONS CALL ROUTING ALTERNATIVE

INTRODUCTION

The present disclosure is in the field of mobile telecommunications.

Embedded mobile telecommunications devices, such as embedded cellular telecommunications modules, are provided in some motor vehicles, and such modules may be used by vehicle occupants for mobile telephony. Such telecommunications modules are fixedly installed in the vehicle and are highly integrated in the vehicle's electrical system so that, for instance, a vehicle occupant may place mobile phone calls via interfaces provided by a microphone, loudspeakers, and video display installed in the vehicle. An owner of the vehicle may subscribe for service that would allow occupants of the vehicle to make mobile telephone calls via the embedded mobile telecommunications device.

Most people own portable mobile telecommunications devices, such as handheld cellular telephones, and subscribe to mobile telecommunications service through such portable mobile telecommunications devices.

In some operational scenarios, the telecommunications service provided through an embedded mobile telecommunications device may be better than the service provided through a vehicle occupant's portable mobile telecommunications device. An effective way to take advantage of the service provided through the embedded mobile telecommunications device in such scenarios may be advantageous.

SUMMARY

Disclosed herein is a method for controlling a telecommunications system of a vehicle, the system including a mobile telecommunications module embedded in the vehicle. The method includes determining whether the embedded mobile telecommunications module is better able to communicate with a mobile telecommunications network than is a portable mobile telecommunications device located in the vehicle, using one or more criteria. The method further includes, if the embedded mobile telecommunications module is better able to communicate with a mobile telecommunications network than is the portable mobile telecommunications device based on the one or more criteria, placing a new call with a mobile telecommunications network from the embedded mobile telecommunications module.

In a variation, the criteria include one or more of the following: a battery of the portable mobile telecommunications device is at a low charge level, the embedded mobile telecommunications module has better telecommunications service than does the portable mobile telecommunications device, the portable mobile telecommunications device is located in an area with high mobile telecommunications usage, and a call in which the portable mobile telecommunications device has been engaged or has attempted to engage has failed. Further, in a refinement, if a previous call in which the mobile telecommunications device has been engaged or has attempted to engage has failed, it may be determined whether the previous call was with an emergency service and, if yes, the new call may be placed to a public service answering point via a back office associated with the embedded mobile telecommunications module.

In an additional variation, the method also includes offering to an occupant of the vehicle to place the new call from the embedded mobile telecommunications module prior to placing the new call from the embedded mobile telecommunications module. If the occupant elects to place the new call from the embedded mobile telecommunications module, the new call is placed from the embedded mobile telecommunications module. If the occupant does not elect to place the new call from the embedded mobile telecommunications module, the new call is not placed from the embedded mobile telecommunications module. The new call may be to a telephone number with which the portable mobile telecommunications device has been engaged in a call that has failed or to which the mobile telecommunications device has made a failed call attempt. The new call may also be from an occupant of the vehicle to a stationary back office associated with the embedded mobile telecommunications module, with the stationary back office connecting the call with an occupant-intended recipient of the call.

As another example, the new call may be to a stationary back office associated with the embedded mobile telecommunications module, and the stationary back office connects the new call with a public service answering point using a long telephone number of the public service answering point.

In additional examples, determining whether the portable mobile telecommunications device is in an area with high mobile telecommunications usage may include determining whether the portable mobile telecommunications device is in a vicinity of a sporting or entertainment event or in a vicinity of a natural disaster. Determining whether the portable mobile telecommunications device is in an area with high mobile telecommunications usage may also include determining a volume of cellular phones registered on cellular access points in a vicinity of the portable mobile telecommunications device. Additionally, determining whether the mobile telecommunications module has better service than does the portable mobile telecommunications device may include comparing a signal strength received by the portable mobile telecommunications device with a signal strength received by the mobile telecommunications module.

The present disclosure also discloses a method for controlling a telecommunications system of a vehicle, the system including a mobile telecommunications module embedded in the vehicle. The method includes evaluating a condition of a portable mobile telecommunications device located in the vehicle and, in response to the evaluation, offering to an occupant of the vehicle to place a new call from the embedded mobile telecommunications module. If the occupant elects to place a new call from the embedded mobile telecommunications module, the new call is placed from the embedded mobile telecommunications module.

In a variation, evaluating a condition of the portable mobile telecommunications device may include evaluating a state of charge of a battery of the portable mobile telecommunications device. Evaluating a condition of the portable mobile telecommunications device may also include evaluating whether the embedded mobile telecommunications module has better telecommunication service than does the portable mobile telecommunications device. Yet further, evaluating a condition of the portable mobile telecommunications device may include evaluating whether a call in which the portable mobile telecommunications device has been engaged or has attempted to engage has failed.

This disclosure further discloses a telecommunications system for a vehicle. The system includes a mobile telecommunications module embedded in the vehicle and one or more controllers collectively programmed with the following instructions: evaluate a condition of a portable mobile telecommunications device located in the vehicle; in response to the evaluation, offer to an occupant of the vehicle to place a new call with the embedded mobile telecommunications module; and if the occupant elects to place a new call with the embedded mobile telecommunications module, place the new call from the embedded mobile telecommunications module via a back office associated with the embedded mobile telecommunications module.

In one variation, the instruction to evaluate a condition of the portable mobile telecommunications device may include an instruction to evaluate a state of charge of a battery of the portable mobile telecommunications device. In another variation, the instruction to evaluate a condition of the portable mobile telecommunications device may include an instruction to evaluate whether the embedded mobile telecommunications module has better telecommunication service than the portable mobile telecommunications device. In a further variation, the instruction to evaluate a condition of the portable mobile telecommunications device may include an instruction to evaluate whether the portable mobile telecommunications device is in a geographic area of high mobile telecommunications usage. In yet a further variation, the instruction to evaluate whether the portable mobile telecommunications device is in a geographic area of high mobile telecommunications usage may include an instruction to determine whether the vehicle is in a vicinity of a sporting or entertainment event or a natural disaster. As another example, the instruction to evaluate a condition of the portable mobile telecommunications device may include an instruction to evaluate whether a call in which the portable mobile telecommunications device has been engaged or has attempted to engage has failed.

The above summary does not represent every embodiment or every aspect of this disclosure. Other possible features and advantages will be readily apparent from the following detailed description of the embodiments for carrying out the disclosure when taken in connection with the accompanying drawings and appended claims. Further, combinations and subcombinations of elements described in this disclosure are expressly included in this disclosure.

BRIEF DESCRIPTION OF THE DRAWINGS

FIG. 1 illustrates a vehicle 100 having an embedded mobile telecommunications device, such as a cellular telematics control unit 102.

FIG. 3 schematically illustrates communication among telematics control unit 102, mobile handset 152 and their respective telecommunications networks.

DETAILED DESCRIPTION

Figure 2:
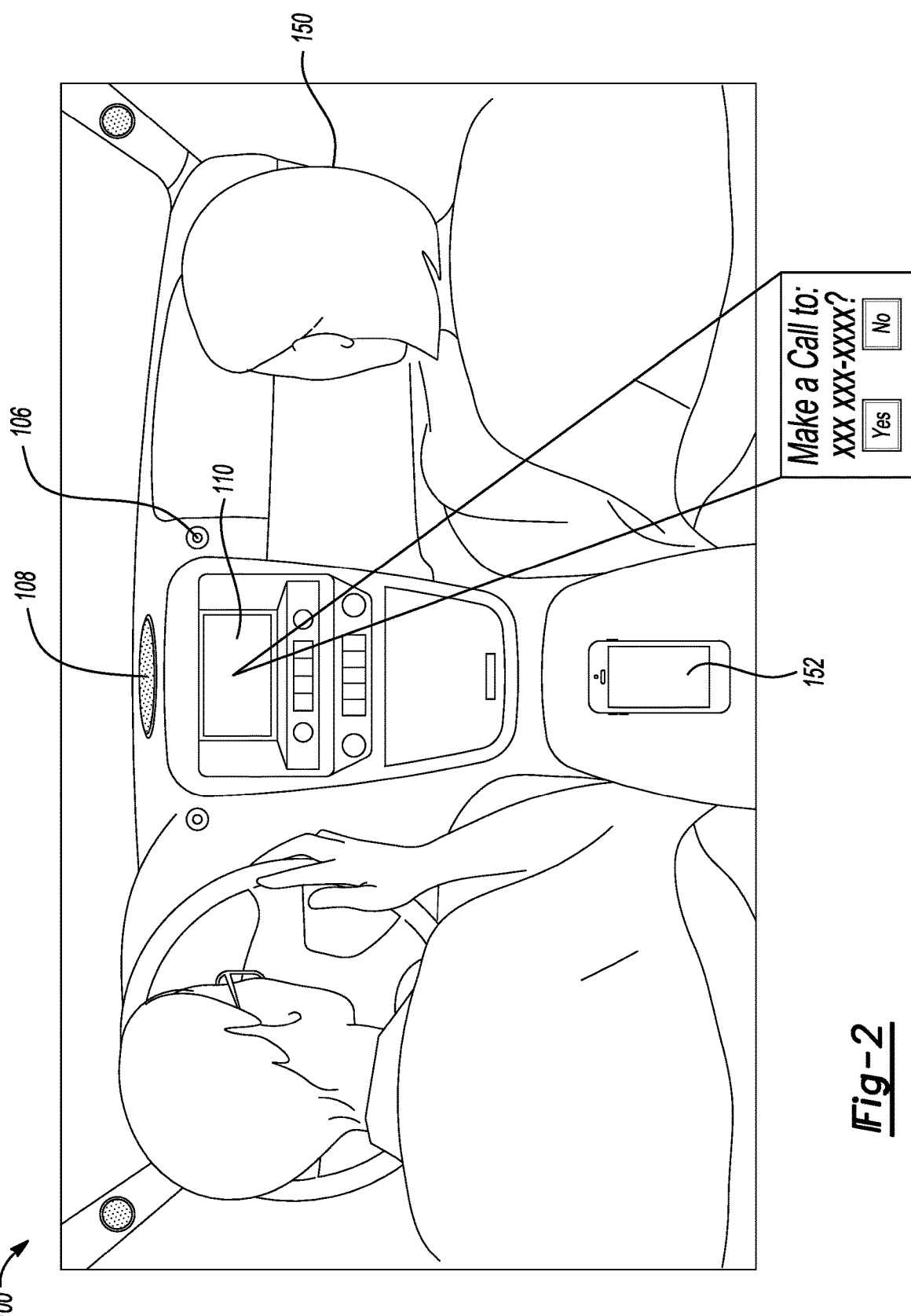
FIG. 2 illustrates the interior of vehicle 100, including therein an occupant 150 and a portable mobile telecommunications device, such as mobile handset 152.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

Referring to FIGS. 1-3, a vehicle 100 includes a mobile telecommunications module, such as a cellular telematics control unit ("TCU") 102, and associated external antenna 104. TCU 102 may be embedded in the electrical system of vehicle 100 such that it is fixedly mounted in vehicle 100 and not intended to be transported apart from vehicle 100 itself. TCU 102 may be connected via the electrical system of vehicle 100 to resources such as a microphone 106, speakers 108 and display 110. TCU 102 communicates via cellular radiofrequency waves 107 with cellular communication towers 109 of a cellular communication network. TCU 102 may be a microcomputer-based device that has sufficient electronic resources (microprocessor(s), memory, inputs, outputs, software, cellular network access devices(s) ("NAD(s)") and the like) to perform the functions ascribed to it herein. Vehicle 100 may also have other embedded electronic control units, such as center stack module ("CSM") 120, also having appropriate electronic resources. Such electronic control units may be networked via wiring and/or data buses among themselves and with TCU 102. As shown in the example of FIG. 3, center stack module 120 has responsibility for controlling microphone 106, speaker 108, and display 110, and, further, center stack module 120 may be connected with TCU 102 via a data bus 124.

TCU 102 may be associated with a stationary "back office" 111 that helps to manage various services offered to the vehicle owner by, say, the manufacturer of the vehicle. Such service may include cellular telephone voice and/or data service provided by a cellular service provider subcontracted by or otherwise associated with the vehicle manufacturer. The owner of vehicle 100 may, if the owner wishes, subscribe to voice and/or data telecommunication service to be provided via TCU 102 as the cellular network interface. Back office 111 has extensive access to information via the Internet and also via communications with cellular network service providers throughout the country.

One or more occupants 150 of vehicle 100 may have one or more portable cellular mobile devices such as mobile handset 152. The portable cellular mobile device(s) may be a number of devices that are intended to be carried by a user, such as a smartphone, a tablet computer, a smartwatch or other portable devices with cellular communications capability. Mobile handset 152 may include short-range radiofrequency connectivity such as Bluetooth technology, so that mobile handset 152 may be substantially as operationally integrated in the electrical system of vehicle 100 as is TCU 102. For instance, occupant 150 may make and receive cellular telephone calls via the cellular service to which occupant 150 has subscribed for use with mobile handset 152. Occupant 150 may use microphone 106 and speakers 108 for such calls and may use display 110 as an interface for making and answering calls through mobile handset 152 using the cellular service to which occupant 150 has subscribed. Mobile handset 152 communicates with cellular towers 109 via radiofrequency radiation 154; the antenna of mobile handset 152 may be integrated therein and is therefore not illustrated. Some or all of cellular towers 109 may in general belong to networks of one or different cellular service providers and are schematically illustrated in FIG. 3. Mobile handset 152 may communicate with the electrical system of vehicle 100 via short-range wireless communication 156. "Short-range wireless communication" may, for the purposes of this disclosure, mean wireless communication adapted for use, say, within a vehicle, but not adapted for, say, communication with a cellular communication network. Bluetooth technology is an example of short-range communication for the purposes of this disclosure. The short-range radiofrequency connectivity through which mobile handset 152 is connected with the electrical system of vehicle 100 may be via connection with an electronic control unit such as center stack module 120 or with connection with one or more other electronic control units embedded in vehicle 100, which may be interconnected via suitable wiring and data buses.

While occupant 150's general preference may be to use the cellular service associated with occupant 150's mobile handset 152 and the owner of vehicle 100 may not even have a general subscription to cellular service via TCU 102, there may be certain operational situations where cellular service provided via TCU 102 is better than cellular service provided via mobile handset 152 and it may be preferable for occupant to place calls via TCU 102.

Cellular service provided via TCU 102 may be better than service provided via mobile handset 152 for various reasons. For instance, antenna 104 available to TCU 102 may be both external to vehicle 100 and larger than the antenna contained in mobile handset 152, providing potentially better reception. Secondly, TCU 102 may have multiple "home" cellular networks available to it due to TCU 102 potentially containing multiple network access devices ("NADs") associated with multiple cellular network service providers. Among those cellular network service providers, one may be able to provide better communications in a particular area or under particular circumstances. Additionally, TCU 102 may be associated with a greater variety of cellular roaming service agreements from which to choose for effective cellular service than is mobile handset 152. Further yet, TCU 102 might have more "aggressive" connection software that more assertively and more repeatedly tries to make cellular connection with a cellular network than does mobile handset 152. As another example, TCU 102 may have more cellular technologies (e.g., 3G, 4G LTE, 5G) at its disposal than does mobile handset 152, with one of those technologies potentially providing better cellular network connectivity in some situations than the others.

Figure 4:
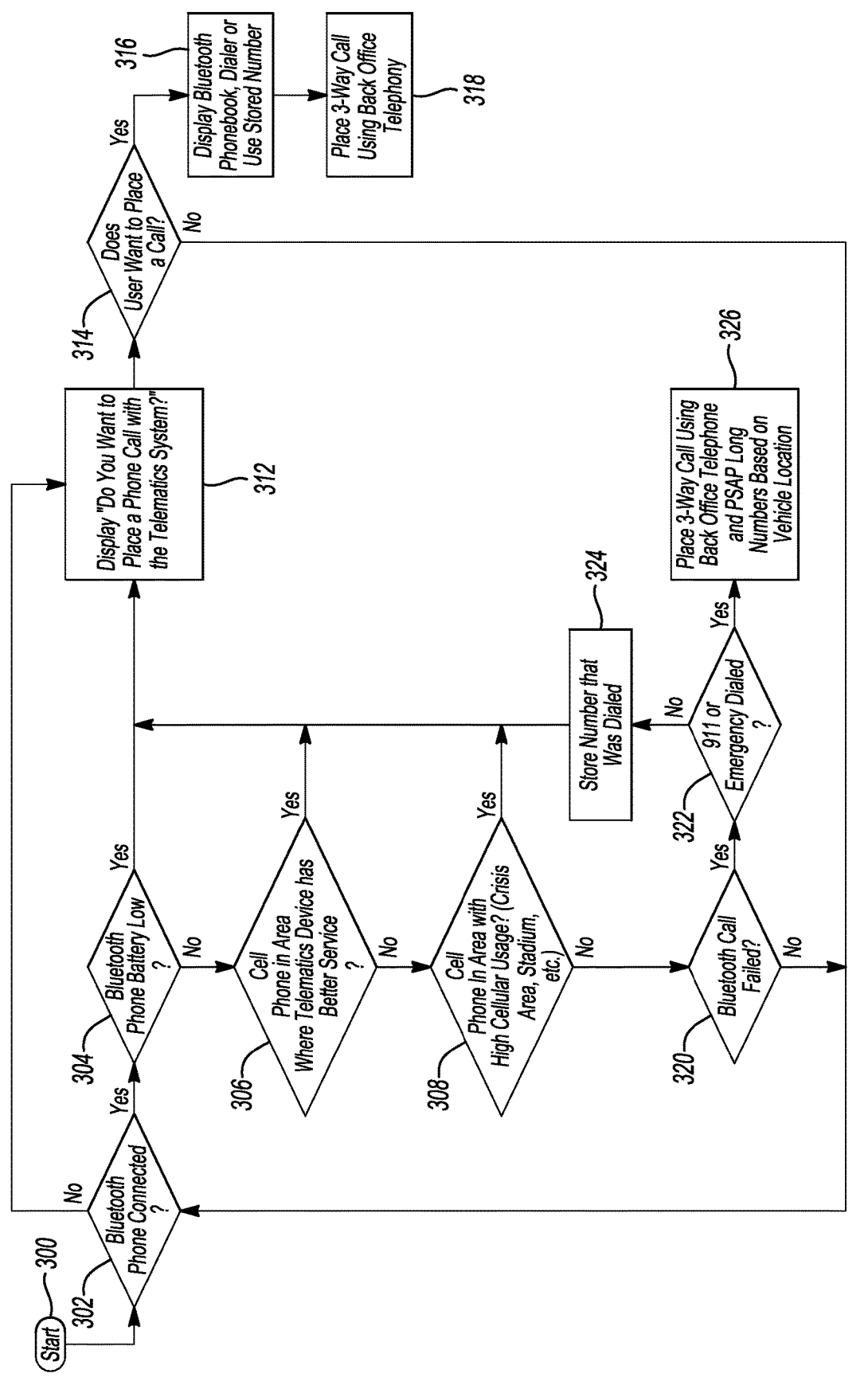
FIG. 4 is a flowchart illustrating control of the telecommunications system of vehicle 100 according to the present example disclosure.

A method for occupant 150 to take advantage of situations in which TCU 102 may provide better communications to mobile handset 152 is illustrated with additional reference to FIG. 4. The method may be carried out by TCU 102, center stack module 120, or collectively with one or more other electronic control units on vehicle 100, which may be networked together. The method begins at block 300, and then at block 302, TCU 102 may determine whether a mobile phone, such as mobile handset 152, is connected to the electrical system of vehicle 100, such as to TCU 102 or another electronic control unit in vehicle 100, via a short-range wireless connection such as Bluetooth technology. If yes, a series of tests may be initiated to determine whether cellular communication via TCU 102 in lieu of cellular communication via mobile handset 152 may be preferable, which may be an evaluation of whether TCU 102 is better able to communicate than is mobile handset 152. At block 304, it may be determined whether the state of charge of mobile handset 152's battery is below a predetermined threshold, say, 5%. (Battery state of charge is typically made available by a mobile handset via Bluetooth technology.) Five percent may be chosen as a threshold below which mobile handset 152 may not be able to maintain a cellular call for a significant period. At block 306, it may be determined whether mobile handset 152 is in an area where TCU 102 has better cellular phone service than mobile handset 152. This may be a comparison of cellular signal strength of mobile handset 152 (also available via Bluetooth technology) and cellular signal strength of TCU 102. At block 308, it may be determined whether the geographic location where portable mobile telecommunications device 152 is located is an area with high cellular usage. (The location of mobile handset 152 may be determined through determining the location of vehicle 100 via GPS (global positioning system) installed in vehicle 100, or through determining the location of mobile handset 152 via GPS installed in mobile handset 152.) Whether this location is an area with high cellular usage may be determined in a number of ways. For instance, it may be known to back office 111 that a highly attended event, such as a sporting event or concert, is occurring in the vicinity of vehicle 100. Back office 111 may also know about a crisis in the vicinity of vehicle 100, such as a natural disaster like a tornado, earthquake, or hurricane that is likely to cause an unusually high level of cellular traffic. Alternatively or in addition, back office 111 may use the knowledge it has about the "loading" of (that is, the number of phones registered or extent of communications occurring on) cellular towers 109 in the vicinity of vehicle 100. It may be preferable to communicate via TCU 102 in places and/or during times of high cellular usage, when communicating via TCU 102 may be more reliable than communicating via mobile handset 152.

At block 312, an option may be offered to occupant 150 whether occupant 150 would like to place (i.e., originate) a new (i.e., originating) phone call from TCU 102. This option may be offered to occupant 150 via display 110 of vehicle 100. As two examples, it may be offered by a textual message on display 110 or by an icon on display 110, such as a telephone icon. The option may also be offered by a voice prompt. If at block 314, occupant 150 responds that she or he would like to place a call, either, say, by tapping display 110 or responding with an audible response, the system at block 316 may display the phonebook from occupant 150's mobile handset 152, may display a dialing keypad, may display a telephone number stored by vehicle 100, such as in TCU 102 or center stack module 120, or may display the number stored at block 324 (as hereinafter described). Once occupant 150 has selected a destination for the phone call, the system may place the call at block 318. Alternatively, if a call in which mobile handset 152 was engaged has been dropped (see the discussion regarding block 320, hereinafter), the call may be redialed via TCU 102 without prior prompting to occupant 150.

The phone call at block 318 may be made by back-office telephony. That is, TCU 102 may make a call to back office 111 and include data to specify occupant 150's intended recipient of the call. Back office 111 may then, in an automated fashion without an operator's intervention, add in occupant 150's selected recipient of the call. Occupant 150 may then engage in the call via microphone 106 and speakers 108 between occupant 150 and occupant 150's selected recipient of the call. Back office 111 will have facilitated the three-way call or otherwise forwarded the call but may not have otherwise participated in the call.

If none of the tests at blocks 304, 306 and 308 are true, it may be determined at block 320 whether a call in which mobile handset 152 was engaged or was attempting to engage on mobile handset 152's cellular network has failed. (Again, such information is available due to the feed from mobile handset 152 through Bluetooth technology.) If such a call or call attempt has failed, it is determined at block 322 whether the call was with an emergency service such as 911 in the United States, 112 in the European Union and some other parts of the world, or other emergency services such as, for instance, police or medical emergency services. If the call or attempted call was with to an emergency service, then the system stores the number that was dialed, at block 324, then proceeds to block 312. The number stored at block 324 may be offered at block 316 as a number to which occupant 150 may elect to place a call, namely in this case, to the number of the failed call. (Collectively herein, "failed call" may refer to a connected call that failed or to a failed attempt to place a call.)

It may be noted that whether a call or attempted call has failed may also be used to infer whether the cellular service provided via TCU 102 is better than cellular service provided via mobile handset 152, at least under the prevailing circumstances.

If, instead, at block 322, it is determined that the failed call was with an emergency service, the system at block 326 may, without active election of such a call by occupant 150, place a three-way call from TCU 102 via back office 111. The participants in such a call may be TCU 102, back office 111, and the public service answering point ("PSAP") responsible for receiving emergency calls based on the location of vehicle 100, the PSAP being added to the call by back office 111. Again, back office 111 may facilitate the three-way or forwarded call in an automated fashion, without a human operator associated with back office 111 necessarily being involved in connecting the call or participating in the conversation. The call to the PSAP use the long telephone number of the relevant PSAP. For the purposes of this disclosure, a "long" telephone number is a standard telephone number (generally, 10-digit in the US as of the date of this disclosure), as opposed to a shortened telephone number (for example, 911 in the US or 112 in some other countries). The long telephone will have the appropriate format for the respective country's telephone system at issue.

Finally, with continuing reference to FIG. 4, if it is determined at block 302 that a mobile handset is not connected to the electrical system of vehicle 100, the system may still offer to an occupant of the vehicle to place a call from TCU 102 at block 312. This may be a supplemental service offered even if the owner of vehicle 100 has not subscribed to mobile service via TCU 102.

The system disclosed herein may provide an important product differentiator to customers. The system may use its contextual knowledge of local geography and local events in the vicinity of vehicle 100. The system may also employ knowledge of cellular network issues of which the system is aware. As a result, the system may proactively recommend that vehicle occupant 150 employ TCU 102 for high-reliability communications. This functionality may be offered as a desirable "back-up" service to the owner of vehicle 100, even if such owner does not otherwise take a subscription to cellular service associated with TCU 102. As an alternative, the service may be provided free of charge to everyone in a known crisis area. Otherwise, the service may be provided for a fee.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for controlling a telecommunications system of a vehicle, the system including a mobile telecommunications module embedded in the vehicle, the method comprising:

determining whether the embedded mobile telecommunications module is better able to communicate with a mobile telecommunications network than is a portable mobile telecommunications device located in the vehicle, using one or more criteria; and based on determining the embedded mobile telecommunications module is better able to communicate with a mobile telecommunications network than is the portable mobile telecommunications device based on the one or more criteria, placing a new call with a mobile telecommunications network from the embedded mobile telecommunications module.

2. The method of claim 1, wherein the criteria include one or more of the following:

(a) a battery of the portable mobile telecommunications device is at a low charge level;

(b) the embedded mobile telecommunications module has better telecommunications service than does the portable mobile telecommunications device;

(c) the portable mobile telecommunications device is located in an area with high mobile telecommunications usage; and (d) a previous call in which the portable mobile telecommunications device has been engaged or has attempted to engage has failed.

3. The method of claim 1, further comprising:

offering to an occupant of the vehicle to place the new call from the embedded mobile telecommunications module prior to placing the new call from the embedded mobile telecommunications module;

and wherein:

when the occupant elects to place the new call from the embedded mobile telecommunications module, placing the new call from the embedded mobile telecommunications module; and when the occupant does not elect to place the new call from the embedded mobile telecommunications module, refraining from placing the new call from the embedded mobile telecommunications module.

4. The method of claim 1, wherein the new call is to a telephone number with which the portable mobile telecommunications device has been engaged in a call that has failed or to which the mobile telecommunications device has made a failed call attempt.

5. The method of claim 1, wherein:

the new call is from an occupant of the vehicle to a stationary back office associated with the embedded mobile telecommunications module; and the stationary back office connects the new call with an occupant-intended recipient of the call.

6. The method of claim 1, wherein:

the new call is to a stationary back office associated with the embedded mobile telecommunications module; and the stationary back office connects the new call with a public service answering point using a long telephone number of the public service answering point.

7. The method of claim 2, wherein:

when a previous call in which the portable mobile telecommunications device has been engaged or has attempted to engage has failed, determining whether the previous call was with an emergency service and, when the previous call was with an emergency service, placing the new call to a public service answering point via a back office associated with the embedded mobile telecommunications module.

8. The method of claim 2, wherein determining whether the portable mobile telecommunications device is in an area with high mobile telecommunications usage comprises determining whether the portable mobile telecommunications device is in a vicinity of a sporting or entertainment event or a natural disaster.

9. The method of claim 2, wherein determining whether the portable mobile telecommunications device is in an area with high mobile telecommunications usage comprises determining a volume of cellular phones registered on cellular access points in a vicinity of the portable mobile telecommunications device.

10. The method of claim 2, wherein determining whether the mobile telecommunications module has better service than does the portable mobile telecommunications device comprises comparing a signal strength received by the portable mobile telecommunications device with a signal strength received by the mobile telecommunications module.

11. A method for controlling a telecommunications system of a vehicle, the system including a mobile telecommunications module embedded in the vehicle, the method comprising:

evaluating a condition of a portable mobile telecommunications device located in the vehicle;

in response to the evaluation, offering to an occupant of the vehicle to place a new call from the embedded mobile telecommunications module;

when the occupant elects to place a new call from the embedded mobile telecommunications module, placing the new call from the embedded mobile telecommunications module;

determining whether the embedded mobile telecommunications module is better able to communicate with a mobile telecommunications network than is the portable mobile telecommunications device located in the vehicle, using one or more criteria; and based on determining the embedded mobile telecommunications module is better able to communicate with a mobile telecommunications network than is the portable mobile telecommunications device based on the one or more criteria, placing a new call with a mobile telecommunications network from the embedded mobile telecommunications module.

12. The method of claim 11, wherein evaluating a condition of the portable mobile telecommunications device comprises evaluating a state of charge of a battery of the portable mobile telecommunications device.

13. The method of claim 11, wherein evaluating a condition of the portable mobile telecommunications device comprises evaluating whether the embedded mobile telecommunications module has better telecommunication service than does the portable mobile telecommunications device.

14. The method of claim 11, wherein evaluating a condition of the portable mobile telecommunications device comprises evaluating whether a call in which the portable mobile telecommunications device has been engaged or has attempted to engage has failed.

15. A telecommunications system for a vehicle, the system comprising:

a mobile telecommunications module embedded in the vehicle; and one or more controllers collectively programmed with the following instructions:

evaluate a condition of a portable mobile telecommunications device located in the vehicle;

in response to the evaluation, offer to an occupant of the vehicle to place a new call from the embedded mobile telecommunications module;

when the occupant elects to place a new call from the embedded mobile telecommunications module, place the new call from the embedded mobile telecommunications module via a back office associated with the embedded mobile telecommunications module;

determine whether the embedded mobile telecommunications module is better able to communicate with a mobile telecommunications network than is the portable mobile telecommunications device located in the vehicle, using one or more criteria; and when the embedded mobile telecommunications module is better able to communicate with a mobile telecommunications network than is the portable mobile telecommunications device based on the one or more criteria, place a new call with a mobile telecommunications network from the embedded mobile telecommunications module.

16. The system of claim 15, wherein the instruction to evaluate a condition of the portable mobile telecommunications device includes an instruction to evaluate a state of charge of a battery of the portable mobile telecommunications device.

17. The system of claim 15, wherein the instruction to evaluate a condition of the portable mobile telecommunications device includes an instruction to evaluate whether the embedded mobile telecommunications module has better telecommunication service than the portable mobile telecommunications device.

18. The system of claim 15, wherein the instruction to evaluate a condition of the portable mobile telecommunications device includes an instruction to evaluate whether the portable mobile telecommunications device is in a geographic area of high mobile telecommunications usage.

19. The system of claim 18, wherein the instruction to evaluate whether the portable mobile telecommunications device is in a geographic area of high mobile telecommunications usage comprises an instruction to determine whether the vehicle is in a vicinity of a sporting or entertainment event or a natural disaster.

20. The system of claim 15, wherein the instruction to evaluate a condition of the portable mobile telecommunications device includes an instruction to evaluate whether a call in which the portable mobile telecommunications device has been engaged or has attempted to engage has failed.

* * * * *